United States Patent
Green et al.

(10) Patent No.: US 7,510,212 B2
(45) Date of Patent: Mar. 31, 2009

(54) AIRBAG TETHER CUTTER AND VENT CLOSER

(75) Inventors: David J. Green, Brigham City, UT (US); Brent Parks, Englewood, CO (US); Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 11/728,815

(22) Filed: Mar. 26, 2007

(65) Prior Publication Data

US 2008/0238050 A1 Oct. 2, 2008

(51) Int. Cl.
*B60R 21/16* (2006.01)
(52) U.S. Cl. .............. 280/743.2; 280/743.1; 280/738; 280/740
(58) Field of Classification Search .......... 280/730.1, 280/732, 743.1, 743.2
See application file for complete search history.

(56) References Cited

U.S. PATENT DOCUMENTS

| | | | | |
|---|---|---|---|---|
| 6,076,854 | A | 6/2000 | Schenck et al. | 280/743.2 |
| 6,390,501 | B1 | 5/2002 | Greib et al. | 280/743.2 |
| 6,513,835 | B2 * | 2/2003 | Thomas | 280/743.2 |
| 6,736,426 | B2 * | 5/2004 | Winters et al. | 280/743.2 |
| 6,932,384 | B2 | 8/2005 | Waid et al. | 280/739 |
| 6,932,385 | B2 * | 8/2005 | Hawthorn et al. | 280/739 |
| 7,249,783 | B2 * | 7/2007 | Parkinson et al. | 280/743.2 |
| 2004/0232677 | A1 * | 11/2004 | Fischer et al. | 280/739 |
| 2005/0040634 | A1 * | 2/2005 | Braun et al. | 280/742 |
| 2005/0212273 | A1 | 9/2005 | Thomas et al. | 280/739 |
| 2006/0186655 | A1 * | 8/2006 | Ehrke | 280/743.1 |
| 2006/0284404 | A1 * | 12/2006 | Green et al. | 280/743.2 |
| 2007/0108750 | A1 * | 5/2007 | Bauer et al. | 280/740 |
| 2007/0194561 | A1 * | 8/2007 | Thomas | 280/728.2 |

\* cited by examiner

*Primary Examiner*—Toan C To
(74) *Attorney, Agent, or Firm*—Sally J. Brown; Stoel Rives LLP

(57) ABSTRACT

Disclosed are embodiments of apparatus, methods, and systems for cutting one or more tethers connected with an airbag cushion and simultaneously, or sequentially, closing one or more vent openings. In one embodiment, an airbag module is provided that includes a tether opening and at least one vent opening. The tether may extend through the tether opening adjacent to a cutter. The cutter may be configured to cut the tether upon deployment of an actuator. A vent door configured to block the vent opening(s) upon deployment of the actuator may also be provided. This embodiment may therefore provided for simultaneous, or sequential, cutting of the tether and closing of the vent opening(s) with a single actuator.

19 Claims, 3 Drawing Sheets

AIRBAG TETHER CUTTER AND VENT CLOSER

TECHNICAL FIELD

The present invention relates generally to the field of automotive protective systems. More specifically, the present invention relates to a mechanism for cutting one or more tethers connected with an airbag cushion and closing one or more vent openings.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Figure 1A:
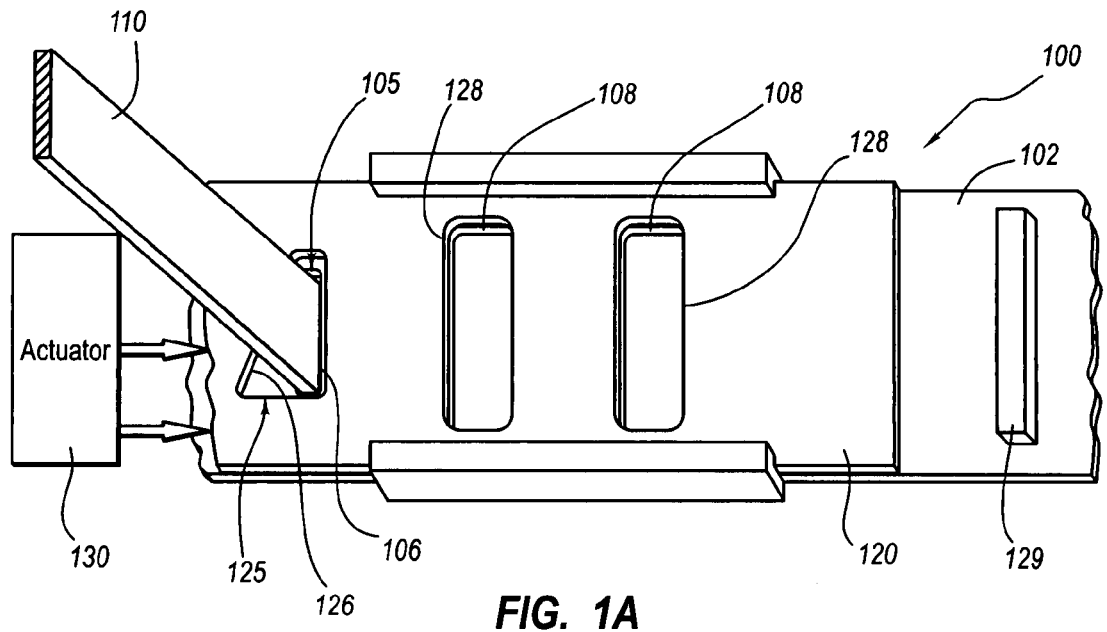
FIG. 1A depicts an embodiment of an airbag tether cutter and vent closer in a first, pre-deployment configuration.

Described below are embodiments of apparatus, methods, and systems for cutting one or more tethers connected with an airbag cushion and closing one or more vent openings. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, or characteristics may be combined in any suitable manner in one or more embodiments.

In one embodiment of the invention, an airbag module is provided. The module may comprise a housing having a tether opening and at least one vent opening. An airbag cushion may be included in the module, and may comprise a tether for restraining the inflation size of the cushion. The tether may extend through the tether opening adjacent to a cutter. The cutter may be configured to cut the tether upon deployment of an actuator to thereby allow the airbag cushion to fully deploy. A vent door configured to block the vent opening(s) upon actuation of the actuator may also be provided. Thus, in some embodiments, a single actuator may be provided to cut the tether and close one or more vent openings in the module.

The actuator may be configured to simultaneously close the vent opening(s) while the tether is being cut. Alternatively, the actuator may be configured to sequentially perform these actions. For example, the tether may be cut first, after which further movement from the actuator results in closing the vent opening(s). In other configurations, it may be preferable to configure the device to close the vent opening(s) just prior to cutting the airbag tether.

Numerous configurations for accomplishing the cutting of an airbag tether and closing of one or more vent openings are contemplated. For example, in one embodiment, a sliding vent door may be provided. The door may be configured with one or more vent door openings and a cutter opening. Prior to deployment, the vent door openings are at least partially aligned with the vent openings in the module housing so as to allow for inflation gas to exit therethrough, and the cutter opening is at least partially aligned with a tether opening in the module housing. Following deployment of an actuator, the vent door openings are misaligned with the vent openings so as to block the exit of inflation gas and the cutter opening is misaligned with the tether opening, thereby resulting in the tether having been cut.

In another illustrative configuration, a vent door may be connected with a separate tether cutter. The vent door may again have one or more vent door openings initially aligned with one or more vent openings in fluid communication with an airbag cushion. Following deployment, the vent door openings are misaligned with the vent opening(s) such that the exit of inflation gas is blocked. The separate cutter may be connected to the vent door and positioned adjacent to a tether opening, such that deployment of an actuator forces a cutting blade associated with the cutter against the tether and also results in closure of the vent opening(s).

Figure 1B:
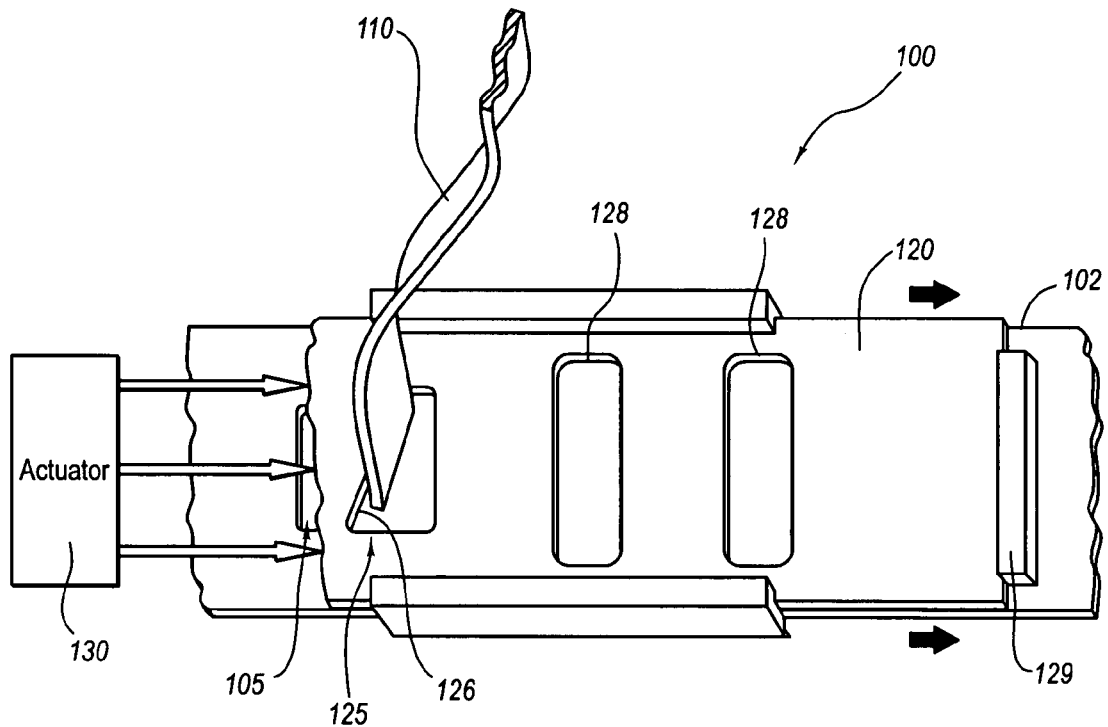
FIG. 1B depicts the embodiment of FIG. 1A following deployment.

With reference to the accompanying figures, embodiments of the invention will now be described in greater detail. FIGS. 1A and 1B depict an airbag module 100. Airbag module 100 includes a housing 102 having a tether opening 105 and a plurality of vent openings 108. A tether 110, which is attached to the inside of an airbag cushion 104 (see FIGS. 2A and 2B), extends through tether opening 105. It should be understood that, whereas the end of tether 110 outside of tether opening 105 is not shown, in most implementations it would be bound in some way to the airbag module housing 102, or to a mechanism connected with housing 102. It should also be understood that the view from the perspective of FIGS. 1A and 1B is from the outside of the airbag module, and therefore the airbag cushion (not shown) would be positioned inside of openings 105 and 108.

Airbag module 100 also includes a sliding vent door 120 connected with housing 102. Sliding vent door 120 includes a plurality of openings. Opening 125 comprises a cutter and is initially at least partially aligned with tether opening 105 so as to allow tether 110 to exit both openings from within the inside of the housing 102. Cutter opening 125 may include a sharpened cutting blade 126 to facilitate cutting the tether. Tether opening 105 may also include a sharpened edge 106, such that the tether 110 is cut by shearing the cutting blade 126 against the sharpened edge 106. In the depicted embodiment, cutting blade 126 is angled relative to sharpened edge 106 (and is also angled relative to tether opening 105), which may further facilitate providing a smooth, clean cut through the tether 110.

A plurality of vent door openings 128 in sliding vent door 120 are also provided. Vent door openings 128 are initially positioned such that they at least partially overlap with vent openings 108, as shown in FIG. 1A (in the embodiment shown in the figures, they fully overlap). In this configuration, excess inflation gas may exit the airbag module housing 102 through vent openings 108. This may be useful for partial airbag deployments, such as deployments for an "out of position occupant." In such deployments, it may be desirable to restrain the airbag cushion with a tether and simultaneously provide a vent to release unwanted inflation gas.

Figure 2A:
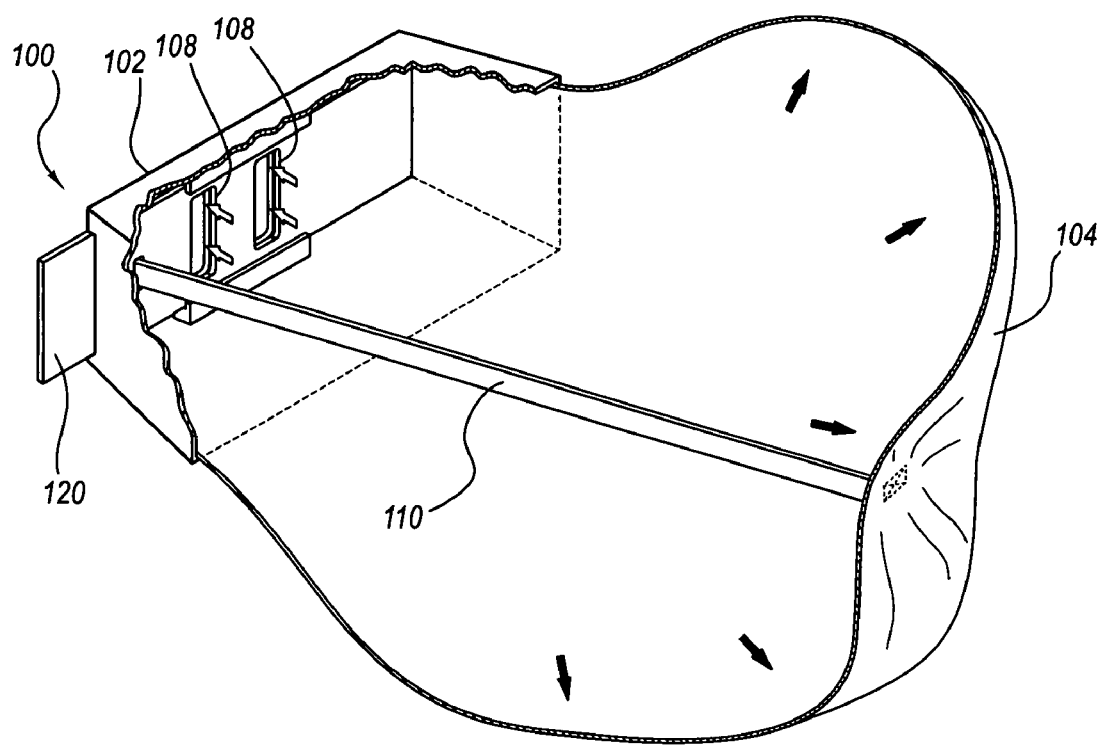
FIG. 2A depicts an embodiment of an airbag module in a restrained deployment configuration.

For example, FIG. 2A shows airbag module housing 100 prior to deployment of sliding vent door 120. In this configuration, tether 110 restrains airbag cushion 104 and inflation gas is able to exit through vent openings 108, as indicated by the arrows in FIG. 2A.

Upon detecting a condition that would warrant full deployment of the airbag cushion, and an accompanying release of tether 110, vent door openings 128 are configured to misalign with vent openings 108 so as to block inflation gas from exiting vent openings 108. In particular, an actuator 130 causes door 120 to slide to the right (from the perspective of FIGS. 1A and 1B) to slide vent door openings 128 away from vent openings 108, as shown in FIG. 1B. A stop mechanism 129 may also be provided to ensure that door 120 does not slide too far. The stop mechanism 129 shown in FIGS. 1A and 1B comprises a raised wall, but a variety of other stop mechanisms will be apparent to those of ordinary skill in the art. The depicted embodiments are configured such that cutter 125 slides along with vent door openings 128 upon deployment of actuator 130. The tether 110 may therefore be severed substantially simultaneously with the closing of the vent openings 108, both actions of which may be driven by the same actuator 130.

As shown in FIG. 1B, once the actuator 130 has been deployed to slide door 120, vent openings 108 are blocked by door 120. More particularly, vent door openings 128 are positioned to the side of, and are no longer aligned with, vent openings 108 (not shown in FIG. 1B) such that door 120 prevents the escape of inflation gas from the airbag cushion. In addition, as also shown in FIG. 1B, tether cutting blade 126 has been moved past sharpened edge 106 of tether opening 105 so as to result in severing tether 110.

Figure 2B:
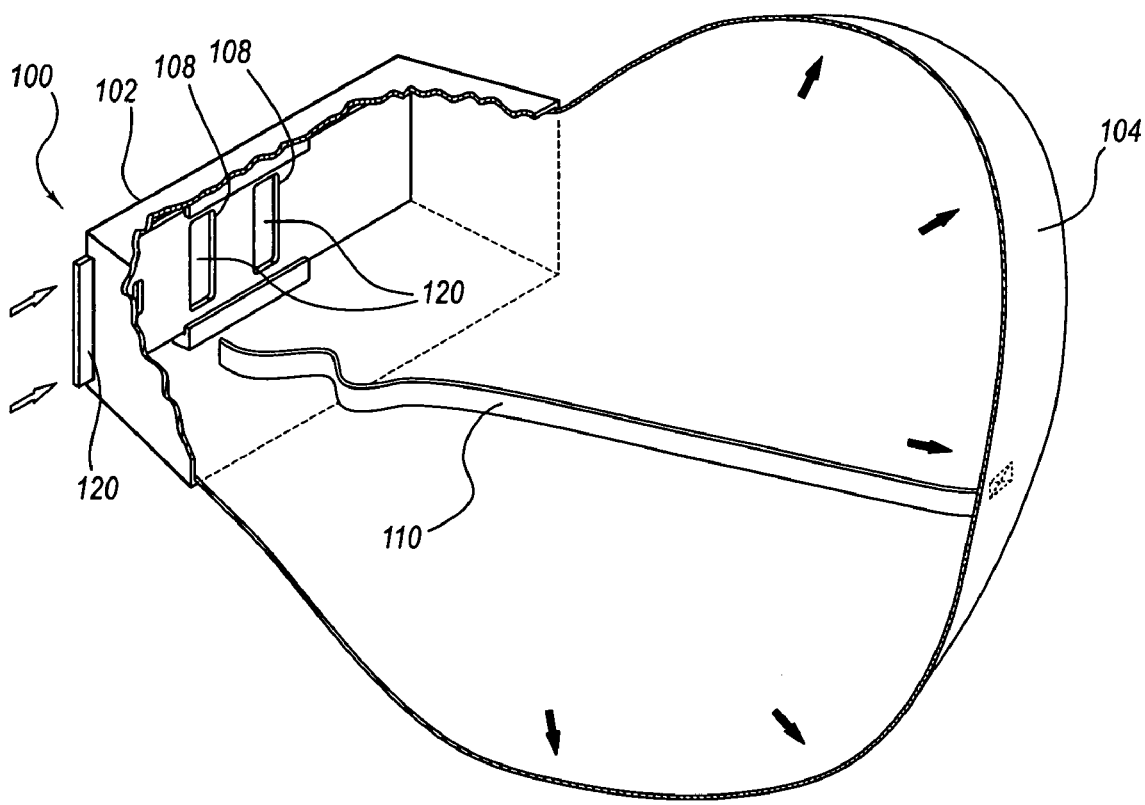
FIG. 2B depicts the embodiment of FIG. 2A in a fully-deployed configuration.

FIG. 2B depicts airbag module 100 following deployment of sliding door 200. As shown in the figure, tether 110 has been cut, thereby allowing for full inflation of airbag cushion 104. In addition, vent openings 108 have been blocked by door 120 to allow the inflation gas that would otherwise have escaped to assist in fully inflating airbag cushion 104.

Figure 3A:
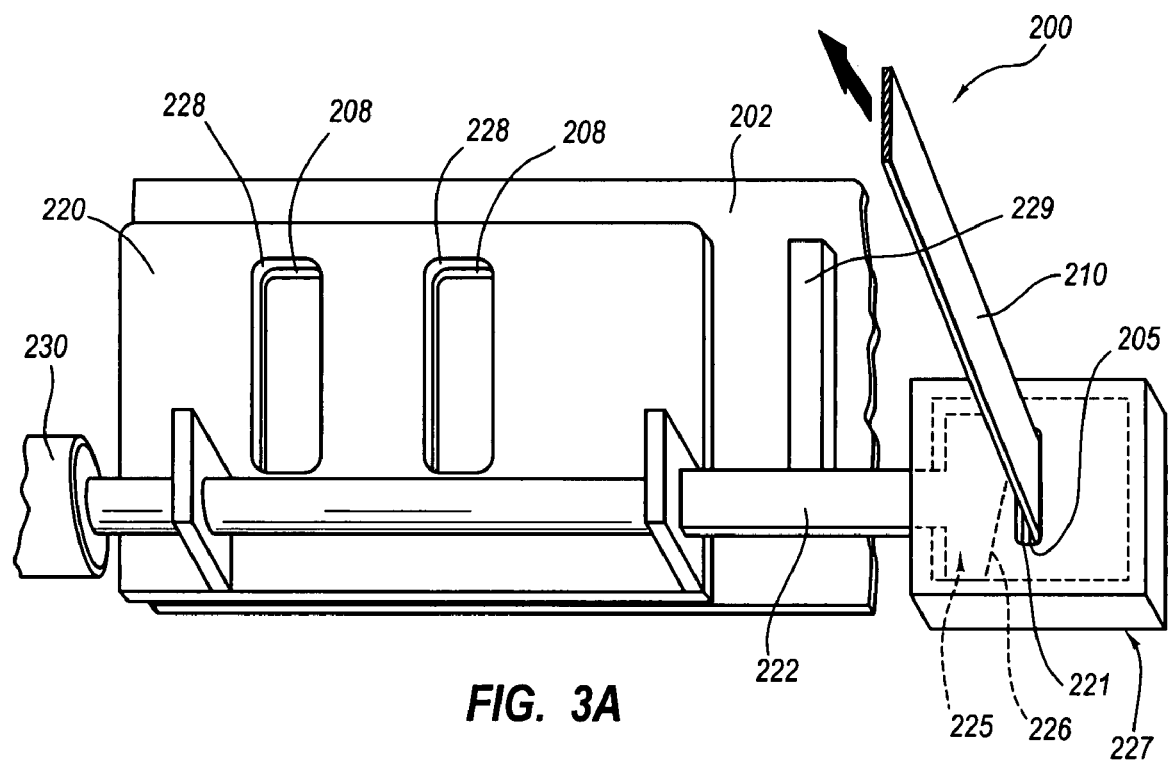
FIG. 3A depicts a second embodiment of an airbag tether cutter and vent closer in a first, pre-deployment configuration.
Figure 3B:
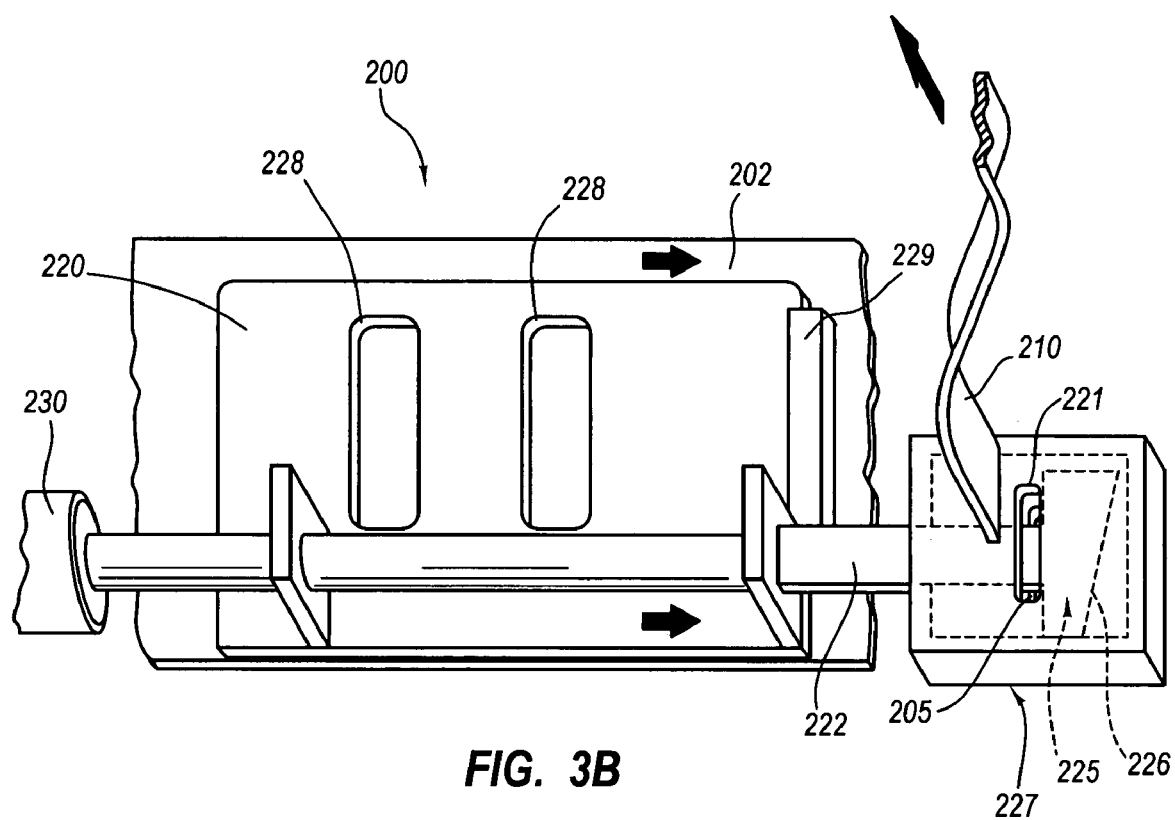
FIG. 3B depicts the embodiment of FIG. 3A following deployment.

Another embodiment of the invention is depicted in FIGS. 3A and 3B. Airbag module 200 also includes a housing 202 having a tether opening 205 and a plurality of vent openings 208. Again, a tether 210 extends through tether opening 205 and is positioned adjacent to a cutter 225. Cutter 225 includes a sharpened cutting blade 226, which is positioned in a cutter guide housing 227 to facilitate cutting tether 210. Cutter guide housing 227 includes an opening 221 that is aligned with tether opening 205 to allow tether 210 to extend through both aligned openings. Like the embodiment of FIGS. 1A and 1B, cutting blade 226 is angled relative to tether opening 205.

Airbag module 200 also includes a vent door 220 connected with the housing 202. Vent door 220 has a plurality of vent door openings 228, each of which are, prior to deployment, at least partially aligned with openings 208 in the module housing, as shown in FIG. 3A. Vent door 220 is connected with cutter 225 via actuation shaft 222. Actuator 230 is configured to actuate shaft 222, which, in turn, causes movement of both vent door 220 and cutter 225.

As vent door 220 is moved, vent door openings 228 are misaligned with openings 208, thereby blocking inflation gas from exiting the module, as shown in FIG. 3B. Cutter 225, which is also connected with shaft 222, is moved simultaneously with vent door 220. Accordingly, as vent door 220 is moved to block openings 208, cutter 225 is also moved towards tether opening 205 to cut tether 210. As with the embodiment of FIGS. 1A and 1B, a stop mechanism 229 may be provided to limit the actuation distance of the vent door 220, if needed. Of course, other embodiments are contemplated in which the actuation distance is limited and determined by the actuator itself, rather than by a separate stop mechanism.

A variety of different actuators may be used with embodiments of the invention. For example, in some embodiments, a solenoid actuator may be used, which, upon receipt of an electrical signal causes a rod, shaft, or other mechanism to move within a desired range of motion to cause a vent door to cover one or more vent openings. Other possible actuators include, for example, a pneumatic cylinder or spring-loaded actuator. Still other actuators that are suitable for use in connection with embodiments of the invention will be apparent to those of ordinary skill in the art.

Any such actuator may be configured to receive a signal indicative of a condition that would warrant partial deployment of an airbag, such as the presence of an "Out of Position Occupant." Upon receiving such a signal, the actuator may be configured to result in severing of one or more tethers connected to an airbag cushion to restrain its deployment size. The same actuator may be configured to simultaneously, or sequentially, resulting in blocking/closure of one or more vents in fluid connection with the airbag cushion.

Cutter 125 in the embodiment of FIGS. 1A and 1B, and cutter 225 in the embodiment of FIGS. 3A and 3B are both examples of means for cutting a tether. Vent door 120 in the embodiment of FIGS. 1A and 1B, and vent door 220 in the embodiment of FIGS. 3A and 3B are both examples of means for selectively blocking at least one vent opening.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims. Note also that elements recited in means-plus-function format are intended to be construed in accordance with 35 U.S.C. §112 ¶6.

The invention claimed is:

1. A method for releasing an airbag tether, the method comprising:
    positioning a tether through a tether opening, wherein the tether is connected to an airbag cushion;
    actuating a cutter to cut the tether and thereby allow for full expansion of the airbag cushion, wherein the cutter comprises an opening in a sliding door, and wherein, prior to actuation of the cutter, the sliding door opening at least partially overlaps with the tether opening; and
    closing at least one vent opening in fluid communication with the airbag cushion, wherein the actuation of the cutter causes the at least one vent opening to close.

2. The method of claim 1, wherein the steps of actuating the cutter and closing the at least one vent opening are performed substantially simultaneously.

3. The method of claim 1, wherein the steps of actuating the cutter and closing the at least one vent opening are performed sequentially.

4. The method of claim 1, wherein the cutter comprises a cutting blade.

5. The method of claim 4, wherein the cutting blade is connected with a sliding door having at least one opening corresponding with the at least one vent opening, and wherein, prior to actuation of the cutter, the at least one opening at least partially overlaps with the at least one vent opening, and wherein, following actuation of the cutter, the at least one opening is misaligned with the at least one vent opening so as to block inflation gas from exiting the at least one vent opening.

6. The method of claim 5, wherein the sliding door is connected with the cutting blade via an actuation shaft.

7. The method of claim 4, wherein the tether opening comprises a sharpened edge, and wherein the tether is cut by shearing the cutting blade against the sharpened edge.

8. The method of claim 7, wherein the cutting blade is angled relative to the sharpened edge.

9. The method of claim 1, wherein the sliding door further comprises a second opening, wherein, prior to actuation of the cutter, the second opening at least partially overlaps with the at least one vent opening, and wherein, following actuation of the cutter, the second opening is misaligned with the at least one vent opening so as to block inflation gas from exiting the at least one vent opening.

10. The method of claim 1, wherein the step of closing at least one vent opening in fluid communication with the airbag cushion comprises substantially simultaneously closing a plurality of vent openings in fluid communication with the airbag cushion.

11. An airbag module, comprising:
 a housing comprising a tether opening and at least one vent opening;
 an airbag cushion, wherein the airbag cushion comprises a tether for restraining the inflation size of the airbag cushion, and wherein the tether extends through the tether opening;
 a cutter positioned adjacent to the tether opening and configured to cut the tether upon actuation of an actuator, wherein the cutter comprises a cutting blade, wherein the tether opening comprises a sharpened edge, and wherein the cutter is configured to cut the tether by shearing the cutting blade against the sharpened edge; and
 a vent door configured to block the at least one vent opening upon actuation of the actuator.

12. The airbag module of claim 11, wherein the cutter is configured to cut the tether substantially simultaneously with the blocking of the at least one vent opening.

13. The airbag module of claim 11, wherein the cutting blade is angled relative to the tether opening.

14. The airbag module of claim 11, wherein the cutting blade is connected with the vent door, wherein the vent door has at least one opening corresponding with the at least one vent opening, and wherein, prior to actuation of the cutting blade, the at least one opening at least partially overlaps with the at least one vent opening, and wherein, following actuation of the cutter, the at least one opening is misaligned with the at least one vent opening so as to block inflation gas from exiting the at least one vent opening.

15. The airbag module of claim 11, wherein the cutting blade is angled relative to the sharpened edge.

16. The airbag module of claim 11, wherein the vent door comprises a sliding door.

17. The airbag module of claim 16, wherein the cutter comprises an opening in the sliding door, and wherein, prior to actuation of the cutter, the sliding door opening at least partially overlaps with the tether opening.

18. The airbag module of claim 17, wherein the sliding door further comprises a second opening, wherein, prior to actuation of the cutter, the second opening at least partially overlaps with the at least one vent opening, and wherein, following actuation of the cutter, the second opening is misaligned with the at least one vent opening so as to block inflation gas from exiting the at least one vent opening.

19. An airbag module, comprising:
 a housing comprising a tether opening and at least one vent opening;
 an airbag cushion, wherein the airbag cushion comprises a tether for restraining the inflation size of the airbag cushion, and wherein the tether extends through the tether opening;
 means for cutting the tether, wherein the cutting means comprises a cutter opening at least partially aligned with the tether opening, wherein the tether extends through the cutter opening and the tether opening, and wherein the cutting means is positioned adjacent to the tether opening; and
 means for selectively blocking the at least one vent opening, wherein the selective blocking means is configured to block the at least one vent opening upon actuation of the cutting means.

* * * * *